US009204272B2

(12) United States Patent
Tang et al.

(10) Patent No.: US 9,204,272 B2
(45) Date of Patent: Dec. 1, 2015

(54) SYSTEM AND METHOD FOR SERVING BINARY SHORT MESSAGE SERVICE CONTENT TO DIFFERENT WIRELESS NETWORKS

(71) Applicants: General Motors LLC, Detroit, MI (US); GM Global Technology Operations, LLC, Detroit, MI (US)

(72) Inventors: Jin Tang, Ada, MI (US); Richard F. Heines, Ortonville, MI (US); David George, Farmington Hills, MI (US); James Doherty, Wyandotte, MI (US)

(73) Assignees: GENERAL MOTORS LLC, Detroit, MI (US); GM GLOBAL TECHNOLOGY OPERATIONS LLC., Detroit, MI (US)

( * ) Notice: Subject to any disclaimer, the term of this patent is extended or adjusted under 35 U.S.C. 154(b) by 331 days.

(21) Appl. No.: 13/737,383

(22) Filed: Jan. 9, 2013

(65) Prior Publication Data
US 2014/0192711 A1    Jul. 10, 2014

(51) Int. Cl.
*H04W 4/18* (2009.01)
*H04W 4/14* (2009.01)

(52) U.S. Cl.
CPC . *H04W 4/18* (2013.01); *H04W 4/14* (2013.01)

(58) Field of Classification Search
None
See application file for complete search history.

(56) References Cited

U.S. PATENT DOCUMENTS 8,325,642 B1 * 12/2012 McHenry et al. ............. 370/312
2006/0195617 A1 * 8/2006 Arndt et al. ..................... 710/1

* cited by examiner

*Primary Examiner* — Dang Ton
*Assistant Examiner* — Ronald H Davis
(74) *Attorney, Agent, or Firm* — Leydig, Voit & Mayer, Ltd.

(57) ABSTRACT

Systems and methods are described for serving binary short message service (SMS) content to multiple mobile devices that use different wireless networks to receive data. One implementation involves a method for serving binary SMS content to the subscribers of a telematics service provider (TSP) on multiple mobile devices that are provisioned with multiple wireless networks. The method involves receiving a binary SMS at a receiving module of an external short message entity (ESME), translating the SMS into a protocol data unit (PDU), and routing the PDU to an SMS gateway producing application. The PDU is directed to a virtual serial port, which is created by the gateway producing application and mapped to a physical serial port at a terminal server. The PDU is sent from the terminal server to a data modem that is provisioned with a wireless carrier, and the data modem is instructed to transmit the SMS to a mobile device.

20 Claims, 7 Drawing Sheets

SYSTEM AND METHOD FOR SERVING BINARY SHORT MESSAGE SERVICE CONTENT TO DIFFERENT WIRELESS NETWORKS

FIELD

The present disclosure relates generally to telematics systems and more particularly to connectivity between telematics service providers and the mobile devices through which services are provided to subscribers.

BACKGROUND

Telematics units within vehicles provide subscribers with connectivity to a telematics service provider (TSP). The TSP provides subscribers with an array of services including from emergency call handling, stolen vehicle recovery, vehicle diagnostics monitoring, GPS navigation, and more. Telematics units are often provisioned and activated at a point of sale when a subscriber purchases a telematics-equipped vehicle, though they may also be provisioned subsequent to an initial purchase event. Upon activation, the telematics unit can be utilized to provide a subscriber with an array of telematics services such as those described herein. Furthermore, subscribers may configure other mobile devices, such as a smart phone or a tablet computer, with a TSP in order to obtain telematics services on those other devices.

In order to provide telematics services, TSPs may contact subscribers on a variety of media through a variety of communications protocols. A TSP may place a voice or data call to or receive a voice or data call from a telematics unit integrated into a subscriber's vehicle. A TSP may also place a data call to or receive a data call from a subscriber's mobile device, such as a smart phone or tablet computer. Certain types of communication will be appropriate in some situations while other types of communication will be more useful in other circumstances. For example, if a user is experiencing an emergency, audiovisual communication with a live operator is likely to be the optimal method of communication. However, if the TSP is only reminding the subscriber of an upcoming routine maintenance event, a short text or image based message may be more appropriate than audiovisual communication with a live operator. In order for communications between a TSP and a subscriber to be maximally effective and minimally intrusive, flexibility must be maintained in order that the media and protocols used for communication between the TSP and the subscriber may be tailored to the service provided, the content of the communication, and the context in which the subscriber finds him or herself when the communication is to be sent or received.

BRIEF SUMMARY

Systems and methods are described herein for serving binary short message service (SMS) content to multiple mobile devices using different wireless networks to receive data.

One implementation involves a method for serving binary SMS content to the subscribers of a telematics service provider (TSP) on multiple mobile devices that together constitute a group of mobile devices, wherein individual members of subsets of the group of mobile devices are provisioned with a wireless network different from the wireless network with which individual members of other subsets of the group are provisioned, the method comprising receiving a binary SMS at a receiving module of an external short message entity (ESME), translating the binary SMS into a protocol data unit (PDU), routing the PDU to an SMS gateway producing application that has created virtual serial ports which are mapped to physical serial ports at a terminal server, directing the PDU to a virtual serial port which is mapped to a physical serial port at the terminal server, sending the PDU from the terminal server to a data modem that is provisioned with a wireless carrier, and instructing the data modem to transmit the binary SMS to a mobile device provisioned with the same wireless carrier with which the data modem is provisioned.

Another implementation involves non-transitory computer readable media for serving binary SMS content to the subscribers of a telematics service provider (TSP) on multiple mobile devices that together constitute a group of mobile devices, wherein individual members of subsets of the group of mobile devices are provisioned with a wireless network different from the wireless network with which individual members of other subsets of the group are provisioned, the non-transitory computer readable media having computer executable instructions for performing steps of receiving a binary SMS, translating the binary SMS into a protocol data unit (PDU), routing the PDU to an SMS gateway producing application that has created virtual serial ports which are mapped to physical serial ports at a terminal server, directing the PDU to one of the virtual serial ports which is mapped to one of the physical serial ports at the terminal server, sending the PDU from the terminal server to a data modem that is provisioned with a wireless carrier, and instructing the data modem to transmit the binary SMS to a mobile device provisioned with the same wireless carrier with which the data modem is provisioned.

A further implementation involves a system for serving binary SMS content to the subscribers of a telematics service provider (TSP) on multiple mobile devices that together constitute a group of mobile devices, wherein individual members of subsets of the group of mobile devices are provisioned with a wireless network different from the wireless network with which individual members of other subsets of the group are provisioned, the system comprising an external short messaging entity (ESME) configured to perform one of receiving a binary SMS and originating a binary SMS, a terminal server, configured to receive a binary SMS and to transmit a binary SMS to a data modem, and one or more data modems provisioned with a first mobile wireless network and configured to transmit binary SMS to mobile devices provisioned with the first mobile wireless network.

BRIEF DESCRIPTION OF THE SEVERAL VIEWS OF THE DRAWINGS

While the appended claims set forth the features of the systems and methods described herein with particularity, the invention, together with its objects and advantages, may be best understood from the following detailed description taken in conjunction with the accompanying drawings of which:

DETAILED DESCRIPTION

Short message services (SMS) provide a low-cost and ubiquitous mechanism through which telematics service providers (TSPs) and their subscribers may communicate. Applications that may be run on mobile devices such as a smart phone or a telematics device provide another mechanism through which TSPs and subscribers may communicate. Such applications may provide a degree of autonomy to communications that may not otherwise be possible. In addition to directly providing a means of communication, SMS provides TSPs with a mechanism through which applications and application updates may be distributed to subscribers. However, unlike the use of text-based SMS as a communication mechanism, use of binary SMS is required for applications and application updates to be distributed. Binary SMS is also more effective than text-based SMS for a variety of other applications, e.g. sending ringtones, images, and configuration data, providing over-the-air (OTA) programming, etc. However, binary SMS is generally not supported across networks operated by different carrier network operators because most carrier network operators only allow binary SMS applications within their own networks. This is particularly problematic for TSPs because their subscribers utilize a variety of different carrier networks to receive telematics services. In order for TSPs to efficiently and effectively take advantage of the capabilities of binary SMS, inter-network use of binary SMS must be enabled.

Before discussing the details of the invention and the environment wherein the invention may be used, a brief overview is given to guide the reader. In general terms, not intended to limit the claims, systems for serving binary SMS applications to mobile devices functioning within multiple different wireless networks maintained by different carrier network operators and methods for operating such systems are described. It will be appreciated that the principles described herein are not limited to telematics units integrated into vehicles, but are applicable to any apparatus capable of sending information to, receiving information from, or both sending information to and receiving information from a telematics service provider (TSP) via binary SMS. In addition to a telematics unit integrated into a vehicle, which is not required to practice the systems and methods described herein, exemplary systems also include any mobile wireless communication devices capable of communicating with a TSP via binary SMS applications, e.g. smart phones, tablet computers, laptop computers, etc.

Figure 1:
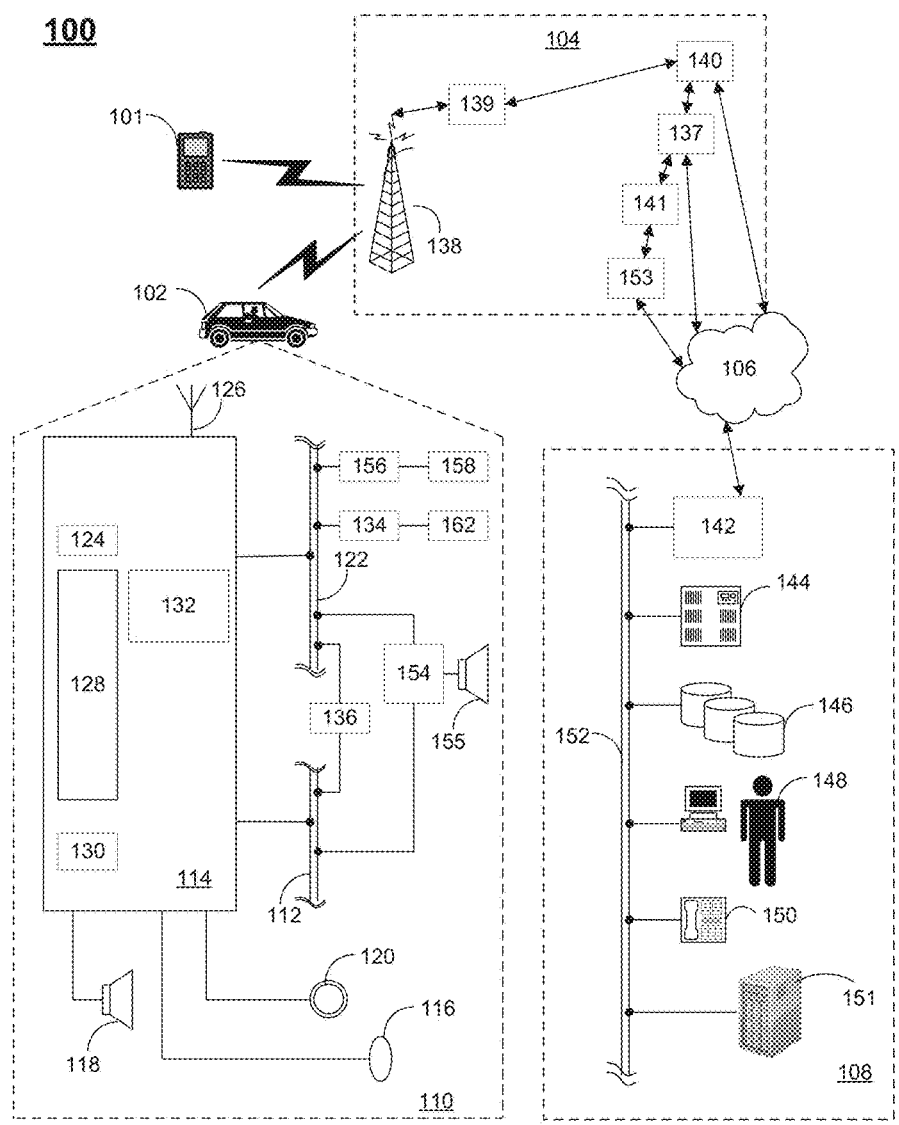
FIG. 1 is a schematic diagram of an operating environment for a mobile vehicle communication system usable in implementations of the described principles.

In general, the illustrative examples described herein pertain to SMS server systems that support binary SMS applications across multiple wireless networks maintained by different network operators. An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes an SMS server, referred to hereinafter more generally as an external short messaging entity (ESME) 151 for serving binary SMS content to multiple wireless networks maintained by different network operators.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126, and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services, Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a standalone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102 or an alternative mobile device 101, and land networks, such as the land network 106. In the illustrative example, the mobile wireless network system 104 includes a set of cell towers 138, as well as a set of base stations 139 and/or mobile switching centers (MSCs) 140. Furthermore, the mobile wireless network system includes a set of one or more data modems 141 as well as a short messaging services center (SMSC) 137. The SMSC 137 is responsible for handling the SMS operations of the mobile wireless network system 104 by routing SMS messages and regulating the process through which SMS messages are sent from one device to another. Alternatively, the set of one or more data modems 141 may not be a part of the mobile network 104 but may merely be connected to the mobile network 104. Mobile wireless network system 104 may also include other networking components facilitating and supporting communications between the mobile wireless network system 104 and land network 106. Alternatively, the set of one or more data modems 141 may not be a part of the mobile network 104 but may merely be connected to the mobile network 104.

As appreciated by those skilled in the art, the mobile wireless network system includes various cell tower/base station/MSC arrangements. For example, abuse station and a cell tower could be co-located at the same site or they could be remotely located, and a single base station could be coupled to various cell towers or various base stations could be coupled o a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 may include a public switched telephone network (PSTN) and/or a transmission control protocol/internet protocol (TCP/IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof. Although the network connecting the wireless network system 104 to the communications center 108 is a land network in FIG. 1, one of skill in the art will understand that it is possible for the communications center 108 to be connected to the wireless network system 104 without a land network.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Network switches 142 may include at least one network switch that can be a private branch exchange (PBX) switch capable of routing incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

The communications center 108 further includes an external short messaging entity (ESME) 151. The ESME 151 is configured to send and receive SMS messages to subscribers of a TSP. The ESME 151 is connected to the set of one of more data modems 141 through a terminal server 153, a TCP/IP network that is part of land network 106, and the network switches 142. Alternatively, the ESME may be connected to the one or more data modems 141 through a TCP/IP network that is part of a wireless network system such as that depicted by 104. Furthermore, the ESME may also be connected directly to the SMSC via the network switches 142 and land network 106 or a wireless network system such as that depicted by 104. The ESME 151 may further be connected to data modems residing in multiple wireless networks, such as the one depicted by 104, in the same fashion as the ESME 151 may be connected to the one or more data modems 141 residing in mobile wireless network 104 as depicted in FIG. 1.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
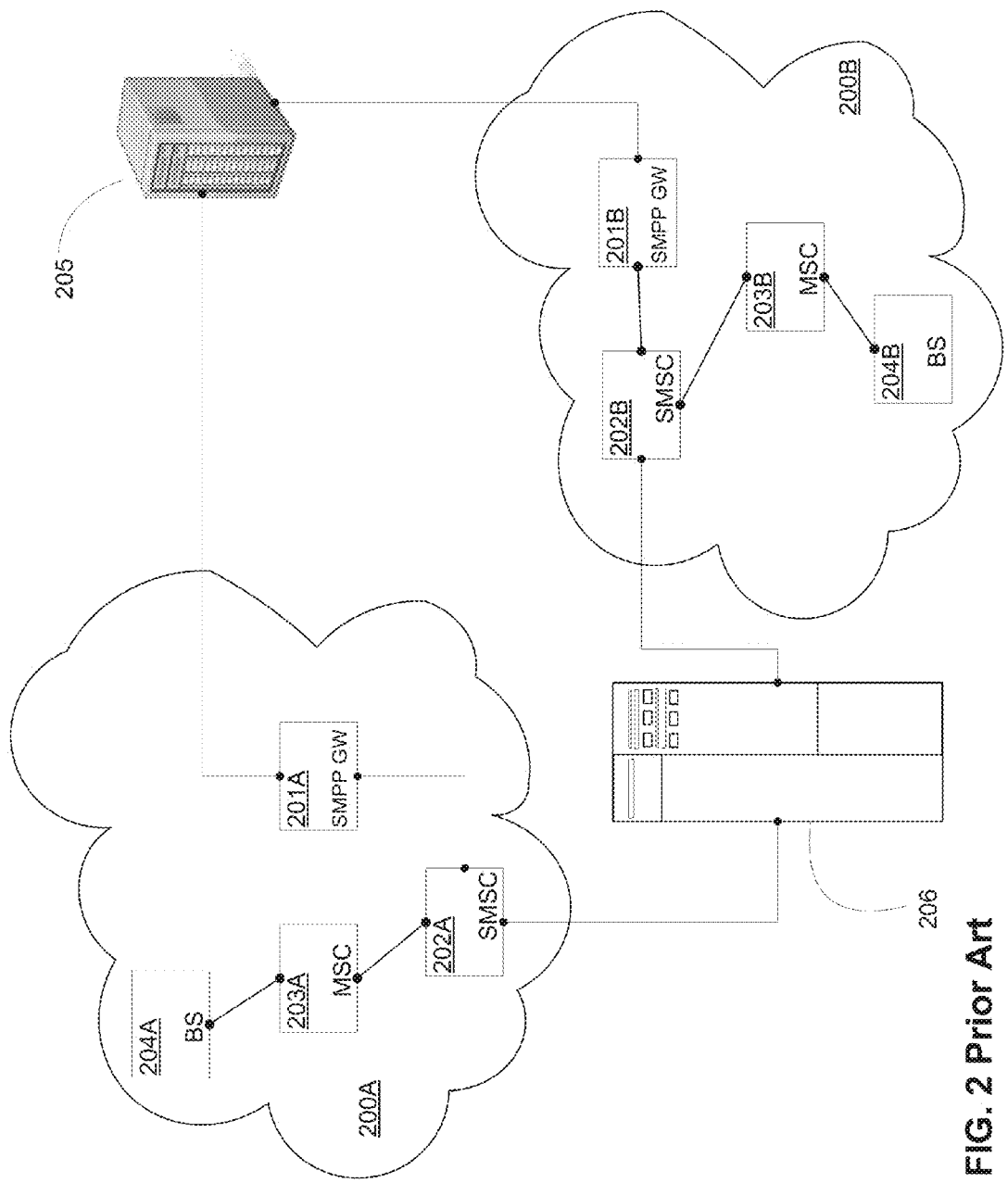
FIG. 2 is a schematic diagram of the prior art method of providing support for binary SMS applications across multiple networks.

FIG. 2 represents a prior art network arrangement used to transmit SMS messages across multiple carrier network. FIG. 2 depicts an external short messaging entity (ESME) 205 that is connected to two carrier networks 200A and 200B. The ESME 205 is connected to a short message service center 202A or 202B in each carrier network 200A and 200B through a short message peer-to-peer gateway (SMPP GW) 201A or 201B. The SMPP GWs 201A and 201B are network facilities that allow SMS messages to be transmitted from one SMS peer entity to another using the SMPP protocol. Short message service centers (SMSC) 202A and SMSC 202B are network elements that deliver SMS messages to their destinations, e.g. a mobile device such as a smart phone or a tablet computer. The SMSCs 202A and 202B handle the SMS operations of carrier networks 200A and 200B, respectively.

SMSCs 202A and 202B of different carrier networks 200A and 200B are connected to each other through SMS gateway 206. In FIG. 2, the SMS gateway 206 is a direct-to-SMSC gateway, i.e. an SMS gateway that connects directly to a carrier network's SMSC. Each carrier network 200A and 200B also contains a mobile switching center (MSC) 203A or 203B, and a base station (BS) 204A or 204B. SMS messages are routed to mobile devices, e.g. smart phones or tablet computers, through MSCs 203A and 203B and BSs 204A and 204B.

In this environment, it is necessary for the operator of the carrier networks 200A and 200B to modify existing service settings and system configuration in order to enable the ESME 205 to provide binary SMS services to subscribers of the carrier network. Furthermore, service providers who utilize ESMEs, such as element 205 in FIG. 2 must collaborate with a number of different carrier network operators in order to address configuration issues that may preclude them from providing services to the subscribers of those carrier networks. Furthermore, some carrier network operators may not provide support for binary SMS services through the SMSCs, such as elements 202A and 202B of FIG. 2. Therefore, it can be expensive and technically challenging for a service provider to link a single ESME to multiple SMSCs residing in different carrier networks as is required for a service provider to provide binary SMS services to the users of multiple carrier networks using the prior art method illustrated by FIG. 2. For example, in order for a telematics service provider (TSP) to provide applications for mobile devices, updates to those applications, and other services to its subscribers, the TSP must negotiate with numerous carrier network operators in order to implement technically challenging modifications to their existing network configurations.

Figure 3:
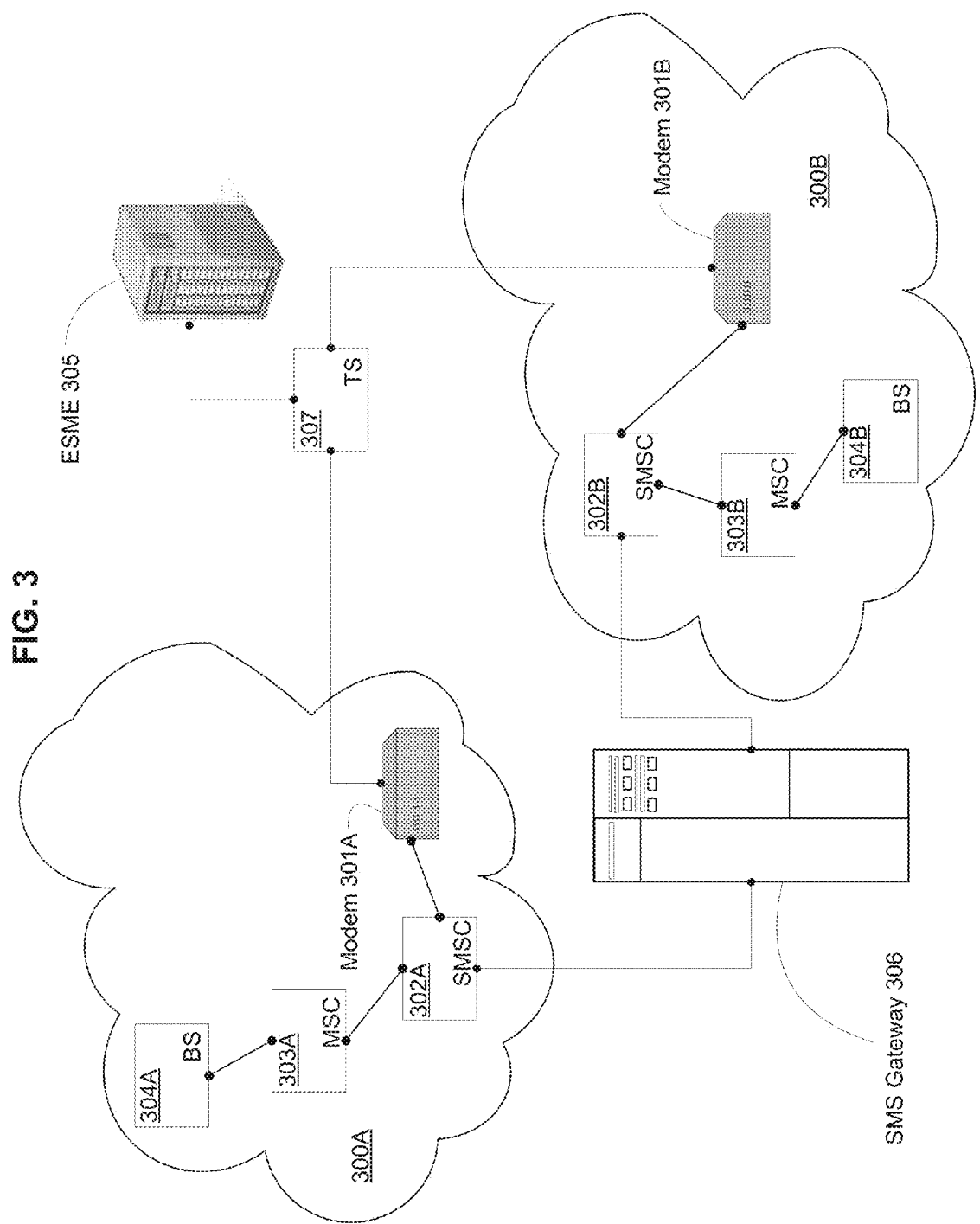
FIG. 3 is a schematic diagram of a system in which support for binary SMS applications across different 2G or 3G networks may be implemented.

With further reference to the architecture of FIG. 1, and turning more specifically to FIG. 3, a set of functional components are depicted that provide an exemplary environment in which features of the systems and methods described in this application may be implemented. A subset of the depicted components in FIG, 3 correspond to a subset of the components depicted in FIG. 1. For example, the carrier networks 300A and 300B in FIG. 3 correspond to the mobile wireless network 104 in FIG. 1, while the ESME 305 in FIG. 3 corresponds to the ESME 151 in FIG. 1. One of skill in the art will understand that FIGS. 1 and 3 are merely exemplary environments in which the systems and processes described herein may be implemented and that certain embodiments of the systems and methods described herein may not utilize each and every component depicted in FIGS. 1 and 3. Similarly, one of skill in the art will recognize that FIGS. 1 and 3 are merely illustrative of the environs in which the systems and methods described in this application may be implemented and do not contain an exhaustive set of the components utilized by all embodiments of the systems and methods described in this application.

FIG. 3 depicts an external short messaging entity (ESME) 305 connected to two data modems 301A and 301B that reside in carrier networks 300A and 300B, respectively. The ESME 305 is connected to data modems 301A and 301B through one or more terminal servers, such as terminal server (TS) 307. Multiple terminal servers may be used if bandwidth requirements necessitate the use of more data modems than a single terminal server can accommodate. The connection between the ESME 305 and the terminal server 307 is through a TCP/IP network. The ESME 305 is thereby able to use a single protocol (TCP/IP) in order to transmit binary SMS messages to modems residing in wireless networks operated by different carrier network operators, such as those depicted by 301A and 301B.

While FIG. 3 depicts only a single data modem for each carrier network, the systems and methods described in this application may include a multiplicity of data modems residing in each carrier network 300A and 300B. A greater number of modems is desirable where high bandwidth is necessary to support a large throughput of data from the ESME 305 to the carrier networks 300A and 300B. In FIG. 3, carrier networks 300A and 300B are 2G or 3G networks. Carrier networks 300A and 300B also comprise SMSCs 302A and 302B, which are network elements that deliver SMS messages to their destinations, e.g. a mobile device such as a smart phone or a tablet computer. SMSCs 302A and 302B are connected to data modems 301A and 301B, respectively. The SMSCs 302A and 302B handle the SMS operations of carrier networks 300A and 300B. SMSCs 302A and 302B of different carrier networks 300A and 300B are connected to each other through SMS gateway 306. In FIG. 3, the SMS gateway 306 is a direct-to-SMSC gateway, i.e. an SMS gateway that connects directly to a carrier network's SMSC. Each carrier network 300A and 300B also contains a mobile switching center (MSC) 303A or 303B, and a base station (BS) 304A or 304B, SMS messages are routed to mobile devices, e.g. smart phones or tablet computers, through MSCs 303A and 303B and BSs 304A and 304B.

Establishing a connection between the ESME 305 and data modems 301A and 301B residing in networks 300A and 300B has a number of advantages over the prior art. By connecting the ESME 305 to data modems 301A and 301B, the idiosyncrasies of binary SMS transmission within each individual network are immaterial to the ESME 151, which is therefore able to use a single, consistent protocol (i.e. TCP/IP) for transmitting binary SMS messages to multiple networks operated by different carrier network operators. Compared to building a direct connection between an ESME and an SMSC, as described previously with reference to FIG. 2 (prior art), connecting an ESME to a data modem residing within a carrier network provides significantly lower operating costs and eliminates a variety of complexities involved with rendering an ESME simultaneously compatible with multiple SMSCs. In addition, the system described herein utilizes a hardware infrastructure which can be quickly and efficiently constructed by a provider of binary SMS services and carrier network operators in order to enable the provider to provide binary SMS services to subscribers across multiple carrier networks. Furthermore, the system described herein ensures that the subscribers of an SMS services provider, such as a TSP, will be able to receive such services by eliminating the lack of support for binary SMS across multiple different networks.

Figure 4:
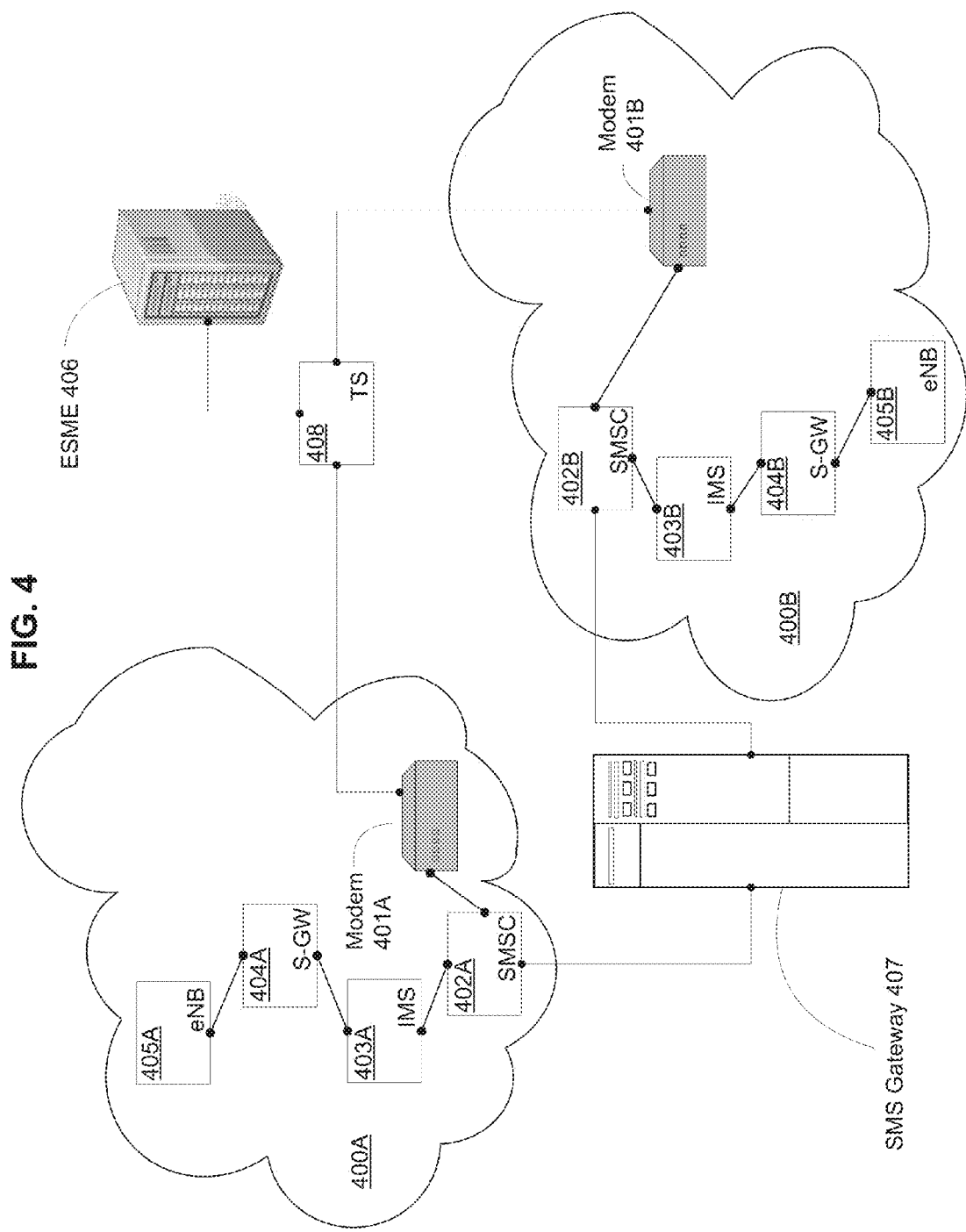
FIG. 4 is a schematic diagram of a system in which support for binary SMS applications across different LIE networks may be implemented.

FIG. 4 depicts an alternative environment in which features of the systems and methods described in this application may be implemented. FIG. 4 depicts an external short messaging entity (ESME) 405 that is connected to two data modems 401A and 401B that reside in carrier networks 400A and 400B, respectively. The ESME 405 is connected to data modems 401A and 401B through one or more terminal servers such as terminal server 408. Multiple terminal servers may be used if bandwidth requirements necessitate the use of more data modems than a single terminal server can accommodate. The connection between the ESME 405 and the terminal server 408 is through a TCP/IP network. The ESME 405 is thereby able to use a single protocol (TCP/IP) in order to transmit binary SMS messages to modems residing in wireless networks operated by different carrier network operators, such as those depicted by 401A and 401B.

While FIG. 4 depicts only a single data modem for each carrier network, the systems and methods described in this application may include a multiplicity of data modems residing in each carrier network 400A and 400B. A greater number of modems is desirable where high bandwidth is necessary to support a large throughput of data from the ESME 405 to the carrier networks 400A and 400B. In FIG. 4, carrier networks 400A and 400B are LTE networks. Carrier networks 400A and 400B also comprise SMSCs 402A and 402B are network elements that deliver SMS messages to their destinations, e.g. a mobile device such as a smart phone or a tablet computer. SMSCs 402A and 402B are connected to data modems 401A and 401B, respectively. The SMSCs 402A and 402B handle the SMS operations of carrier networks 400A and 400B. SMSCs 402A and 402B of different carrier networks 400A and 400B are connected to each other through SMS gateway 406. In FIG. 4, the SMS gateway 406 is a direct-to-SMSC gateway, i.e. an SMS gateway that connects directly to a carrier network's SMSC. Carrier networks 400A and 400B each contains an IP Multimedia Subsystem (IMS) 403A and 403B that provide a suite of multimedia services to the subscribers of the carrier networks 400A and 400B. Serving gateways (SON) 404A and 404B are connected to IMS 403A and 403B and route data packets to mobile devices, e.g. smart phones, tablet computers, and telematics units, through an evolved nobe B (eNB) 405A or 405B.

Figure 5:
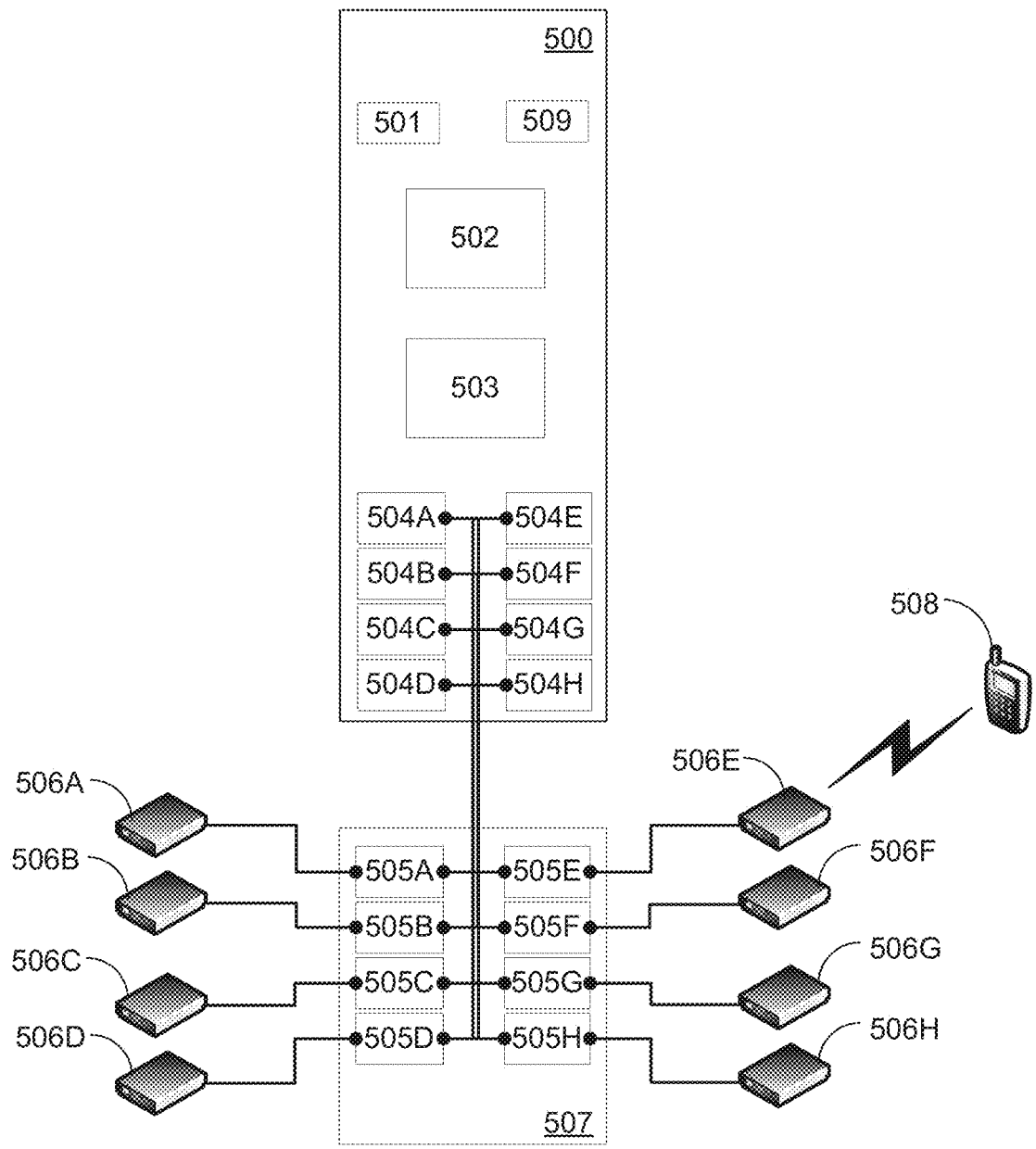
FIG. 5 is a schematic diagram of an SMS server capable of serving binary SMS content to multiple mobile wireless networks.

FIG. 5 is a schematic diagram of an SMS server capable of serving binary SMS content to multiple mobile wireless networks. FIG. 5 depicts an SMS server system that includes an SMS server 500 which contains a receiving module 501 configured to receive an SMS routed to the SMS server 500. The SMS server 500 further comprises a web service module 502, which is a computer readable medium configured with computer executable instructions for running a routing application that routes both outgoing and incoming SMS. The SMS server 500 also comprises a gateway production module 503, which is a computer readable medium configured with computer executable instructions thereon for running an application capable of producing an SMS gateway. The application run by the gateway production module 503 may be commercial off-the-shelf software such as, e.g., NowSMS from Now-Mobile.com of Whyteleafe, UK. The SMS server 500 further comprises a plurality of virtual COM ports 504A through 504H. The virtual COM ports 504A through 504H correspond to physical serial ports 505A through 505H on a terminal server 507 that is connected to the SMS server 500 through a TCP/IP network. Each of the physical serial ports 505A through 505H corresponds to a modem 506A through 506H. The modems contain SIM cards provisioned with a wireless carrier and are capable of transmitting SMS to mobile devices that are provisioned with the same wireless carrier. For example, in FIG. 5, modem 506E and mobile device 508 are provisioned with the same wireless carrier network and therefore modem 506E may transmit an SMS to mobile device 508. SMS server 500 may further comprise a sending module 509 configured to send SMS messages directly to the SMSC of a wireless carrier, such as that depicted by elements 202A and 202B of FIG. 2, via an SMPP GW, such as that depicted by elements 201A and 201B of FIG. 2. Sending module 509 may be used for text-based SMS applications.

Figure 6:
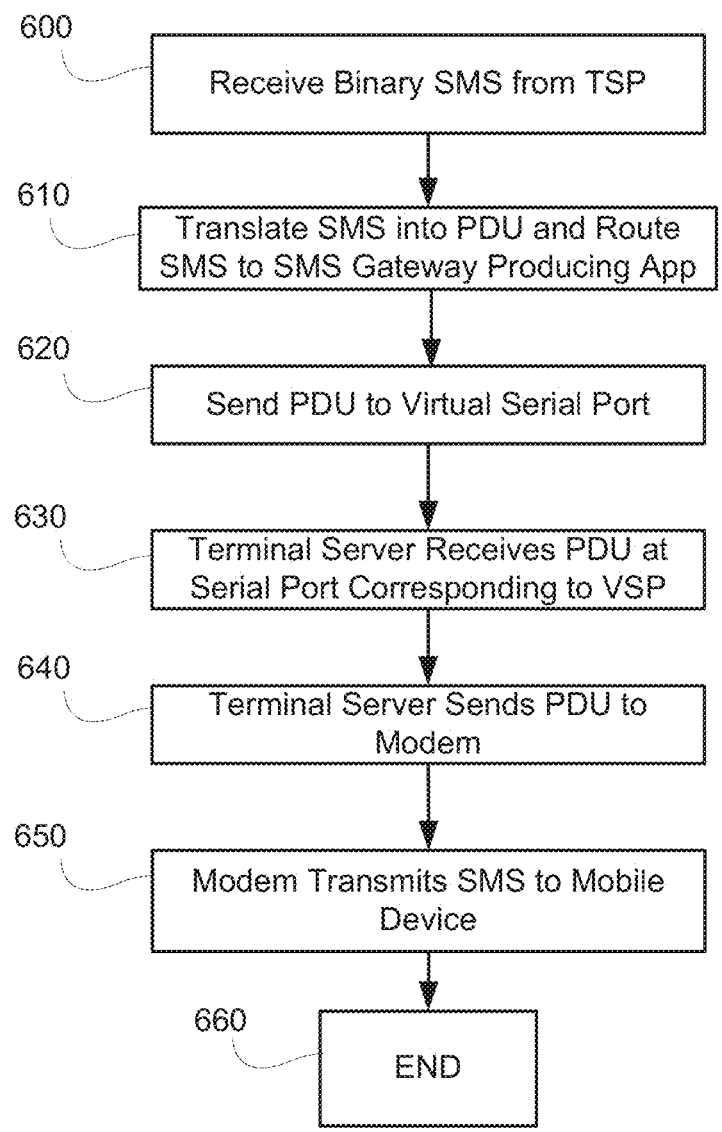
FIG. 6 is a flowchart detailing a method by which an SMS server capable of serving binary SMS content to multiple mobile wireless networks may be operated.

FIG. 6 is a flowchart illustrating a method for operating the systems that support binary SMS applications across multiple carrier networks described herein. FIG. 6 depicts a mobile terminated (MT) flow of information. At step 600, a routing application running on an ESME, i.e. an application running on the ESME designed to route SMS to a wireless carrier or to a modem bank, receives a binary SMS initiated by a TSP. Alternatively, the binary SMS may originate from the ESME. At step 610, the routing application translates the binary SMS into a protocol data unit (PDU) such as an SMPP 3.4 PDU and sends the PDU to an SMS gateway producing application. The SMS gateway producing application may be commercial off-the-shelf software such as, e.g., NowSMS from NowMobile.com of Whyteleafe, UK. At step 620, the SMS gateway producing application sends the PDU to a virtual serial port that is mapped to a physical serial port on a terminal server. The terminal server is connected to the ESME by a TCP/IP network and allows an unlimited number of serial devices, e.g. modems, to be connected to the ESME via virtual serial ports. At step 630, the terminal server receives the binary SMS PDU. At step 640, the terminal server sends the SMS PDU to an appropriate modem within a modem bank. Each modem contains a SIM card that is provisioned with a particular wireless carrier. At step 650, the modem transmits the SMS message to a mobile device that has been provisioned with the same wireless carrier with which the modem has been provisioned. At step 660, the process ends.

Figure 7:
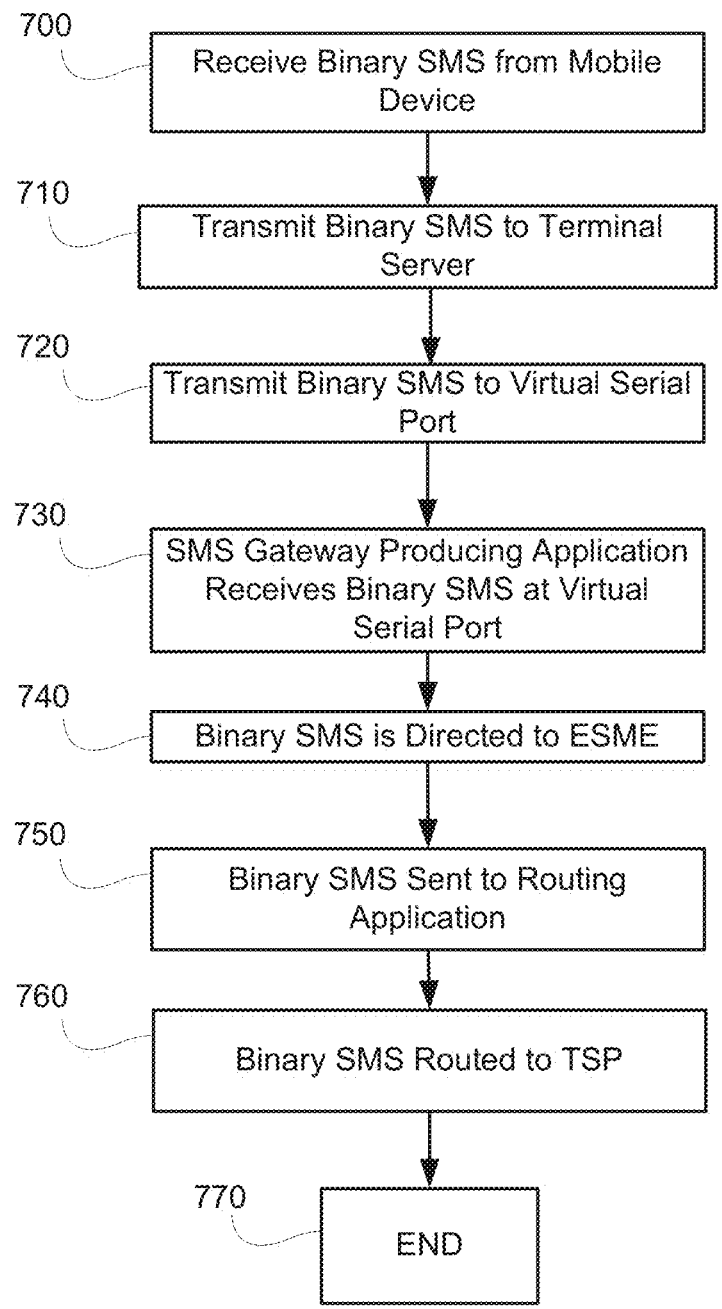
FIG. 7 is a flowchart illustrating a method for operating the systems that support binary SMS applications across multiple carrier networks.

FIG. 7 is a flowchart illustrating a method for operating the systems that support binary SMS applications across multiple carrier networks. FIG. 7 depicts a mobile originated (MO) flow of information. At step 700, a data modem receives a binary SMS from a mobile device that has been provisioned with the same wireless carrier with which the data modem has been provisioned. At step 710, the modem transmits the binary SMS to a terminal server as a protocol data unit (PDU). At step 720, the terminal server transmits the SMS PDU from a physical serial port at the terminal server to a virtual serial port which is mapped to the physical serial port from which the SMS PDU was sent. At step 730, an SMS gateway producing application receives the SMS PDU at a virtual serial port. The SMS gateway producing application may be commercial off-the-shelf software such as, e.g. NowSMS from NowMobile.com of Whyteleafe, UK. At step 740, the SMS gateway producing application directs the SMS PDU to an ESME. At step 750, the SMS gateway producing application sends the SMS PDU to a routing application running on the ESME. At step 760, the SMS PDU is routed by the routing application running on the ES ME to the TSP. At step 770, the process ends.

It will thus be appreciated that the described system and method allow for reliable verification of mobile station identifiers stored at multiple locations. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for serving binary short message service (SMS) content to the subscribers of a telematics service provider (TSP) on multiple mobile devices that together constitute a group of mobile devices, wherein individual members of subsets of the group of mobile devices are provisioned with a wireless network different from the wireless network with which individual members of other subsets of the group are provisioned, the method comprising:
   receiving a binary SMS message at a receiving module of an external short message entity (ESME);
   translating the binary SMS message into a protocol data unit (PDU);
   routing the PDU from the ESME through a transmission control protocol/internet protocol (TCP/IP) network to an SMS gateway producing application that has created virtual serial ports which are mapped to physical serial ports at a terminal server;
   directing the PDU to a virtual serial port which is mapped to a physical serial port at the terminal server;
   sending the PDU from the terminal server to a data modem that is provisioned with a wireless carrier; and
   instructing the data modem to transmit the binary SMS to a mobile device provisioned with the same wireless carrier with which the data modem is provisioned.

2. The method of claim 1 wherein the protocol data unit (PDU) is an SMPP 3.4 protocol data unit (PDU).

3. The method of claim 1 further comprising originating a binary SMS message and sending the binary SMS message to the receiving module of the ESME.

4. The method of claim 1, wherein routing the PDU to an SMS gateway producing application is performed by a routing application running on the ESME.

5. The method of claim 1, wherein the gateway producing application is run by the ESME.

6. The method of claim 1, further comprising originating a binary SMS message at the ESME.

7. Non-transitory computer readable media for serving binary SMS content to the subscribers of a telematics service provider (TSP) on multiple mobile devices that together constitute a group of mobile devices, wherein individual members of subsets of the group of mobile devices are provisioned with a wireless network different from the wireless network with which individual members of other subsets of the group are provisioned, the non-transitory computer readable media having computer executable instructions for performing steps of:

receiving a binary SMS message;

translating the binary SMS message into a protocol data unit (PDU);

routing the PDU from the ESME through a transmission control protocol/internet protocol (TCP/IP) network to an SMS gateway producing application that has created virtual serial ports which are mapped to physical serial ports at a terminal server;

directing the PDU to one of the virtual serial ports which is mapped to one of the physical serial ports at the terminal server;

sending the PDU from the terminal server to a data modem that is provisioned with a wireless carrier; and instructing the data modem to transmit the binary SMS message to a mobile device provisioned with the same wireless carrier with which the data modem is provisioned.

8. The non-transitory computer readable media of claim 7 wherein the protocol data unit (PDU) is an SMPP 3.4 protocol data unit (PDU).

9. The non-transitory computer readable media of claim 7 further comprising originating a binary SMS message and sending the binary SMS message to the receiving module of the ESME.

10. The non-transitory computer readable media of claim 7, wherein routing the PDU to an SMS gateway producing application is performed by a routing application running on the ESME.

11. The non-transitory computer readable media of claim 7, wherein the gateway producing application is run by the ESME.

12. The non-transitory computer readable media of claim 7, further comprising originating a binary SMS message at the ESME.

13. A system for serving binary short message service (SMS) content to the subscribers of a telematics service provider (TSP) on multiple mobile devices that together constitute a group of mobile devices, wherein individual members of subsets of the group of mobile devices are provisioned with a wireless network different from the wireless network with which individual members of other subsets of the group are provisioned, the system comprising:

an external short messaging entity (ESME) configured to perform one of receiving a binary SMS message and originating a binary SMS message;

a terminal server, configured to receive a binary SMS message and to transmit a binary SMS message to a data modem; and one or more data modems provisioned with a first mobile wireless network and configured to transmit binary SMS messages to mobile devices provisioned with the first mobile wireless network, wherein the ESME is connected through a transmission control protocol/internet protocol (TCP/IP) network to an SMS gateway producing application that has created virtual serial ports which are mapped to physical serial ports.

14. The system of claim 13, wherein the ESME comprises a receiving module that comprises a computer readable medium having stored thereon computer executable instructions for receiving binary SMS messages.

15. The system of claim 13, wherein the ESME comprises a web service module comprising a computer readable medium having stored thereon computer executable instructions for routing binary SMS messages toward a destination.

16. The system of claim 13, wherein the ESME comprises a gateway production module comprising a computer readable medium having stored thereon computer executable instructions for producing an SMS gateway.

17. The system of claim 13, wherein the ESME comprises one or more virtual serial ports and the terminal server comprises one or more physical serial ports, each of the virtual serial ports at the ESME being mapped to a physical serial port at the terminal server.

18. The system of claim 17, wherein each of the one or more data modems corresponds to a physical serial port at the terminal server.

19. The system of claim 13, wherein the SMS gateway producing application that has created virtual serial ports which are mapped to physical serial ports and connected to the ESME through a transmission control/internet protocol (TCP/IP) network is located at the terminal server.

20. The system of claim 13, wherein the ESME further comprises a sending module comprising a computer readable medium having stored thereon computer executable instructions for sending SMS messages directly to the short message service center (SMSC) of a wireless network.

* * * * *